Oct. 20, 1936.  T. R. HARRISON ET AL  2,058,078
INSTRUMENT TERMINAL CONSTRUCTION
Original Filed June 23, 1931  2 Sheets—Sheet 1
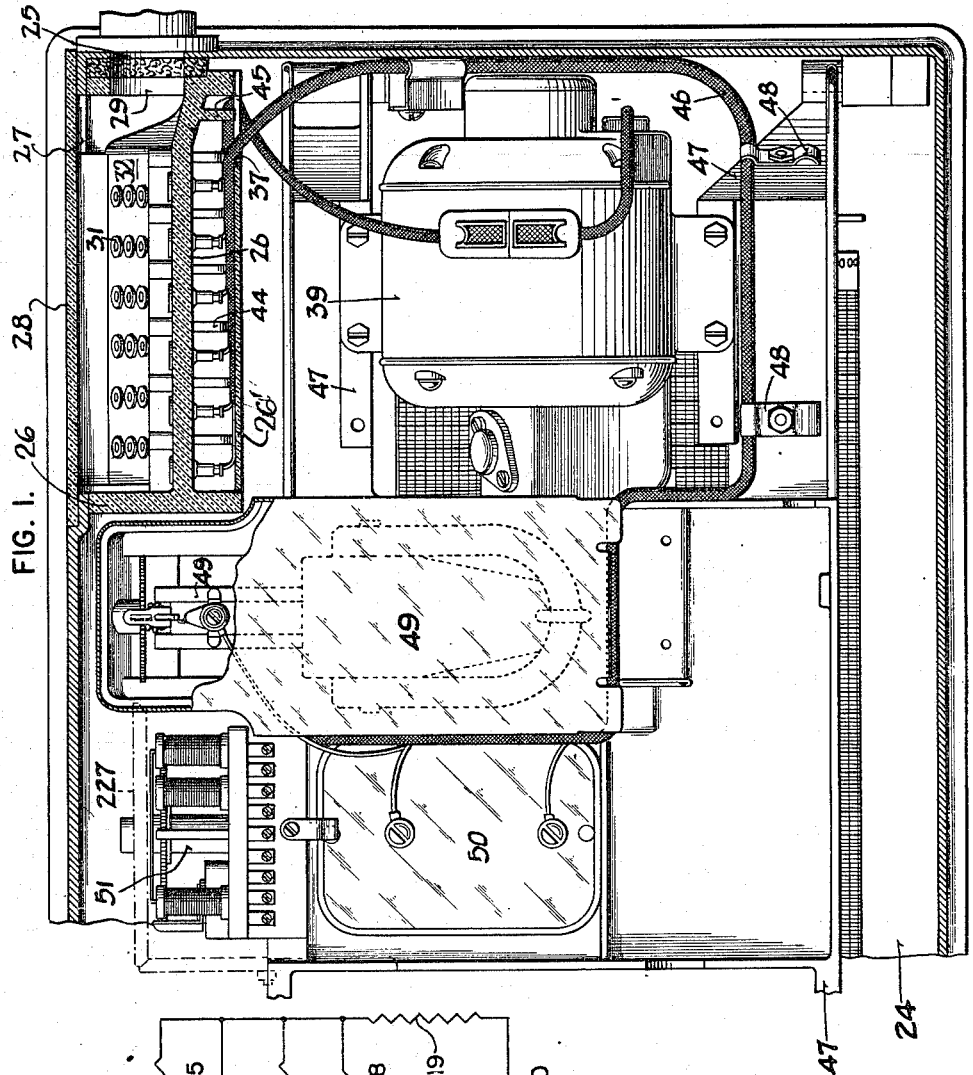
INVENTORS
THOMAS R. HARRISON
ERNEST H. GRAUEL &
JOHN E. KESSLER
BY
John E. Hubbell
ATTORNEY Oct. 20, 1936.  T. R. HARRISON ET AL  2,058,078
INSTRUMENT TERMINAL CONSTRUCTION
Original Filed June 23, 1931    2 Sheets—Sheet 2
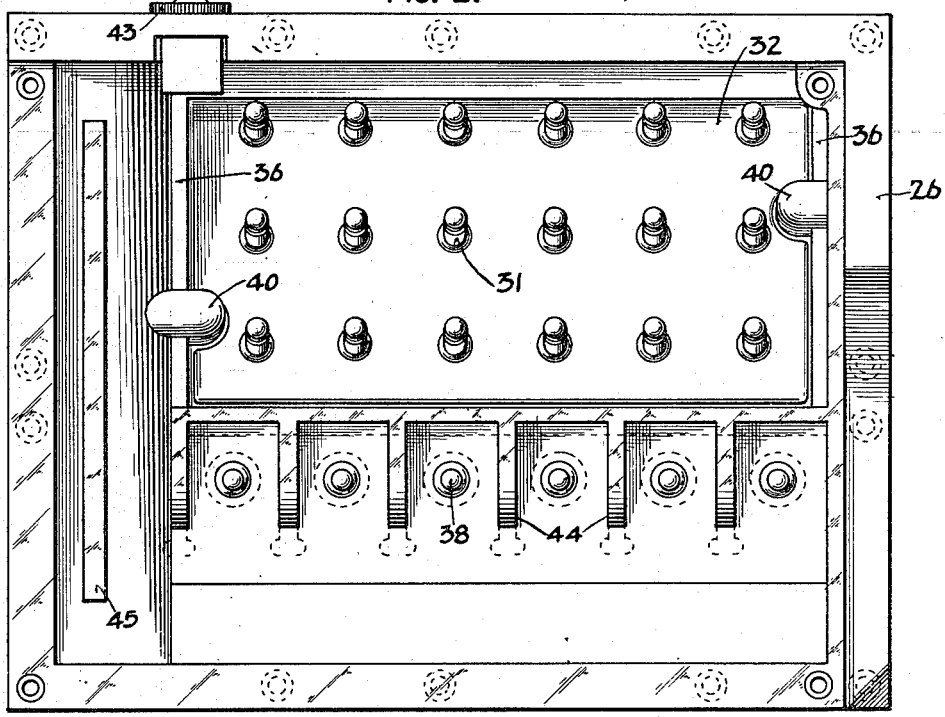
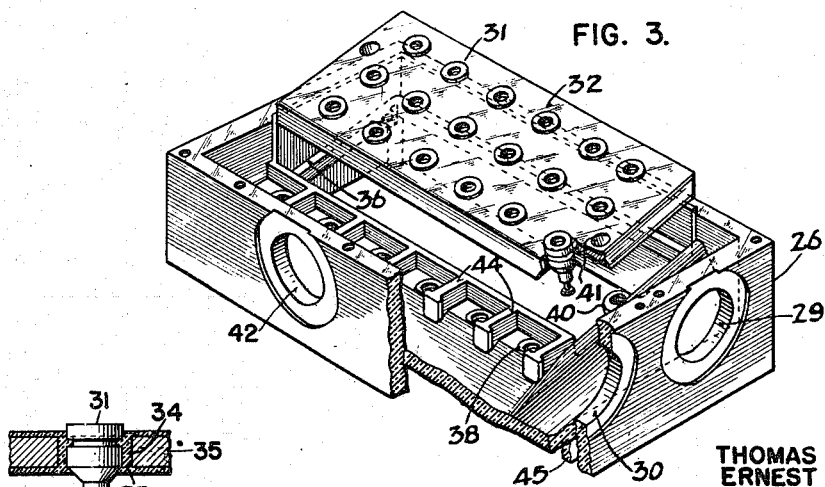
INVENTORS
THOMAS R. HARRISON
ERNEST H. GRAUEL &
JOHN E. KESSLER
BY
John E. Hubbell
ATTORNEY Patented Oct. 20, 1936

2,058,078

UNITED STATES PATENT OFFICE 2,058,078

INSTRUMENT TERMINAL CONSTRUCTION

Thomas R. Harrison, Wyncote, Ernest H. Grauel, Conshohocken, and John Ernest Kessler, Philadelphia, Pa., assignors to The Brown Instrument Company, Philadelphia, Pa., a corporation of Pennsylvania Original application June 23, 1931, Serial No. 546,290. Divided and this application May 26, 1934, Serial No. 727,630

13 Claims. (Cl. 73—32)

The general object of the present invention is to provide an improved form and arrangement of electrical terminals adapted for use in and as a part of an instrument including measuring provisions. More specific objects of the invention are to provide improved terminal constructions adapted to increase the accuracy of operation of instruments in which they may be incorporated, and to facilitate the installation and service of such instruments, and to provide a desirable form of construction easy and inexpensive to manufacture. Other objects and advantages of the invention appear in the detailed description which follows:

In the accompanying drawings:

Fig. 1 is a partial rear elevation, with parts broken away and in section, of a potentiometer instrument including the improved terminal construction;

Fig. 2 is a bottom plan view of the terminal box of the instrument shown in Fig. 1;

Fig. 3 is a top view in perspective of the terminal box showing parts in displaced position; and Fig. 4 is a sectional elevation of a portion of the terminal construction illustrating the terminal mounting.

Fig. 5 is a diagrammatic view of the wiring connections of a potentiometric pyrometer system with which my invention may be employed.

In Fig. 1, we have illustrated the use of the present invention in a potentiometer measuring and recording instrument which is illustrated and described in detail in our copending application, Serial No. 546,290, filed June 23, 1931, of which the present application is a division. For an understanding of the present invention and the general manner of its use in the instrument shown in Fig. 1, reference is made to Fig. 5 wherein 1 designates a substantially constant source of electromotive force such as an ordinary dry cell connected in series with an adjustable resistor 2, the adjustment of which is adapted to vary the current flow in the circuit containing the cell 1, a ballast resistor 3, a slide wire 4, another ballast resistor 5, a calibrating resistor 6, the value and manner of connection of which may be varied in order to vary the measuring range of the potentiometer circuit, completing the series of circuit. A shunt circuit containing resistors 7 and 8, is provided. The resistor 7 is included in the measuring circuit completed through resistor 9, galvanometer 49, switch 11, switch contact 12, conductors 13 and 14, across which are connected a source of potential such as a thermocouple 15, the value of which is to be measured, conductor 16, resistor 17 and sliding contact 18, to the slide wire 4. By making the resistor 7 of metal with a suitable temperature coefficient of electrical resistance, the variation in temperature of a cold junction may be automatically compensated for, as is well known in the art. A resistor 8 is included in an auxiliary circuit extending from resistor 8 through resistor 19, standard cell 50, switch contact 21, switch 11, galvanometer 49, resistor 9, thus completing the circuit. A resistor 22' may be shunted about the galvanometer 49 in order to properly damp its movement when the switch 11 is thrown into engagement with the contact 21 and at the same time engages contact 22.

In operation, the source of electromotive force 1 supplies a steady current through slide wire resistor 4, thereby creating a definite potential drop across that resistor. The circuit including the thermocouple 15 impresses an electromotive force on the slide wire 4 in a direction opposite to that due to the cell 1. By adjusting the sliding contact 18 along the resistor 4, a point on the resistor 4 is reached where the potential of the thermocouple applied to the resistor 4 is equal and opposite to the potential of the resistor 4 at that point. At such time the galvanometer 49, which is normally connected in circuit with the thermocouple 15 by virtue of a normal adjustment of the switch 11 into engagement with contact 12, will have a zero deflection. Variations in the value of the electromotive force of the thermocouple cause deflection of the galvanometer 49 in a direction depending upon whether the variation is an increase or a decrease from that value for which the potentiometer system is previously balanced. The contact 18 may then be adjusted to rebalance the measuring system and return the galvanometer to its zero deflection position.

When the potentiometer circuit is unbalanced, a current due to the thermocouple, flows through the circuit including the resistor 4, and the changes in the position of the contact 18 required to balance the circuit, consequently vary the amount of electrical resistance, due to resistor 4, which is included in the thermocouple and galvanometer circuit, and thus tend to change the constant of the galvanometer circuit. In the arrangement shown, however, more or less of the resistor 17 is connected in series, dependent on the adjustment of the contact 18, and an adjustment of the latter increasing or decreasing the fraction of the resistance 4 in circuit decreases or increases the fraction of the resistance 17 in circuit, and thereby maintains a substantially constant electrical resistance in the thermocouple and galvanometer circuit, so as to maintain an unvarying galvanometer constant throughout the measuring range of the potentiometer.

Inasmuch as the cell 1 tends to deteriorate slightly with age and use, it is necessary from time to time to adjust the resistor 2 in order to maintain a predetermined current flowing through the slide wire resistor 4. For standardizing the current flowing in the slide wire resistor, switch 11 is adjusted into engagement with contacts 21 and 22, thereby connecting the galvanometer 49 in a circuit which includes the standard cell 50 as a source of electromotive force arranged to oppose the potential drop across the resistor 8 due to the current flowing in the resistor 8 from the cell 1. Variations from the standard in the current flowing through resistor 8 from the cell 1, cause a deflection of the galvanometer 49 from the position of zero deflection. The resistor 2 is then adjusted to bring the galvanometer to a position of zero deflection which corresponds to a balance between the potential drop across resistor 8 and the potential of standard cell 50, thereby standardizing the current.

The potentiometer instrument shown generally herein, and illustrated and described in detail in our prior application Serial No. 548,290, is constructed to automatically rebalance the potentiometer circuit following, and in response to variations of a measured electromotive force, which may or may not be the ultimate quantity to be measured. The measured electromotive force may be responsive, or correspond, to a variation in temperature, pressure, speed, humidity, color, etc. For purposes of illustration the invention is shown as applied to the use of thermocouples for measuring temperature variation. As shown in Fig. 5, a plurality of thermocouples 15 are illustrated, and a switch 23 diagrammatically illustrated by which any one of the thermocouples 15 may be selectively associated with the potentiometer circuit for measuring purposes.

For an understanding of the present invention and the general manner of its use in the instrument shown in Fig. 1 it is sufficient to note that said instrument is enclosed in a casing 24 and comprises a supporting framework 47 on which are mounted instrument parts including a relay motor 39 and the galvanometer 49 which controls the actuation by the relay motor of certain adjusting devices including a slide wire adjusting mechanism, the operating shaft of which is intermittently rotated in one direction or the other by the motor 39 through mechanism not illustrated in Fig. 1, but including a driving gear in mesh with the gear 227 mounted on the shaft of said slide wire mechanism. Said instrument also includes switch mechanisms 15 and 11 diagrammatically illustrated in Fig. 5, for connecting a plurality of thermocouples or like devices, one at a time, to the galvanometer, and by which the latter may be connected from time to time to standardizing cell for instrument standardization purposes. The above-mentioned features of instrument construction do not require illustration or specific description herein as they form no part of the present invention, but are illustrative of the fact that any such instrument as is shown in Fig. 1 necessarily includes a considerable number of electrical terminals through which electrical apparatus elements within the instrument casing are interconnected with one another and are connected to external circuit conductors.

The instrument casing 24 is provided with apertures 25, of which only one is shown, through which electrical conductors having portions external to the instrument casing extend into the latter for connection with terminals 31 in a terminal box 26 within the casing 24 and secured thereto by screws or other suitable means.

Conveniently and as shown in Fig. 3, though not necessarily, the terminal box is mounted at the top of the casing 24 and an opening 27 is provided in the casing wall through which access to the interior of the terminal box may be had, the terminal box being open in that direction. A plate 28 may be and preferably is secured to the casing wall over the opening 27 in order to provide protection for the terminals. The terminal box 26, illustrated in detail in Figs. 2 and 3, is provided with openings 29 and 30, each of which registers with a corresponding opening 25 in the instrument casing when the terminal box is mounted therein. The opening 29 is adapted to accommodate the passage of the conductors of the measuring circuit into the terminal box. The conductors associated with the measuring circuit lead to and are connected in any suitable manner as by screw threaded fittings into the terminals 31 carried in the block 32.

The latter, as is clearly shown in Fig. 4, comprises a metallic plate 35 formed with apertures 34 in which the terminals are secured by embedding them in insulating material 33, which forms a sheath for the metallic plate so as to insulate all faces of it. Inasmuch as the instrument shown in Fig. 1 is adapted to measure very small changes in electromotive force, it is highly desirable to avoid thermoelectric forces set up by differences in temperature at the terminals. For this reason we make the block 32 largely of metal of high thermal conductivity so that the temperature of all of the electrical terminals supported in that plate may be maintained at the same temperature. As shown in Fig. 3, the block 32 is arranged to rest upon ledges 36 formed in the body of the terminal box 26, the electrical connections extending from the instrument proper to the terminal block, passing through an opening 37 (see Fig. 1) in the base for bottom 26' of the terminal box 26, and being secured to the small ends of the terminals 31 in a suitable manner as by soldering. The detachable form of connection of the instrument leads from without the casing by means of binding screws, the removable manner of securing the terminal block 32 within its mounting, and its accessibility through the opening 27 of the instrument case, combine to an unusual degree convenience in installing and servicing the intrument, and protection of the terminals from dust, dirt, water, fumes, and from unequal temperature conditions.

The power leads for operating the motor of the instrument are introduced into the terminal box through opening 30 and extend to terminals 38 embedded in the material of the terminal box. The power leads may be secured to the terminals 38 by screw fittings or otherwise, and the leads from the terminals 38 to the motor 39 may be soldered to the small ends of terminals 38 and extend through the opening 37 in a cover on the bottom of the terminal box to the motor.

The terminal box may be and preferably is formed as a molding of insulating material such as bakelite, in which the terminals 38 are embedded during the process of molding, and in which the various openings, projections, contours, and threaded apertures are formed during the molding operation. In a similar manner, the block 32 may be and preferably is formed by molding the terminals 31 in place at the time that the molded insulation 33 is applied over the surface of the metallic block 35. Bosses 40, having screw threaded bushings embedded therein, provide means for securing the terminal block 32 to the box 26 by screws passing through apertures 41 in the terminal block 32.

In the terminal box construction and mounting, as shown in Fig. 1, provision is made for introducing the electrical conductors through the side of the instrument casing 24. Where, as is sometimes desirable, the electrical cables are introduced through the back wall of the casings, they may enter the terminal box through apertures such as are shown at 42, which are formed into the rear wall of the terminal box to accommodate the passage of the conductors. An electrical switch 43, of conventional construction may be and preferably is molded into the body of the terminal box on the front thereof, where it will be conveniently accessible from the front of the instrument for switching on and off the power to the motor 39. Partitions 44 are provided to separate the terminals of the power conductors to insure against short circuiting, and a partition 45 is provided to separate the instrument conductors from the lower conductors which extend from the instrument proper to the terminals. The electrical conductors from the terminal block 32 extend, as shown at 46, along the frame 47 of the instrument, being supported thereon by clips 48, to the galvanometer 49, standard cell 50, and slide wire 51 (see Fig. 1).

From the foregoing, it should be particularly noted that the construction is such that the terminal block 32 is substantially entirely surrounded by heat-insulating material, whereas the binding posts are in good thermal relation to each other. With this construction, heat absorbed from nearby radiant bodies of the casing which is of relatively high thermal conducting material, or by the mechanism within the casing, will not affect the temperature of the terminals 31 and the temperature will be equalized throughout the block so that the temperature of all the terminals will be the same. It is apparent, that, by this invention, we have provided a terminal box construction adapted for facility and minimum of cost in manufacture, together with adequate electrical protection, with provision for maintaining the terminals of the conductors at the same temperature, and with a maximum of accessibility and convenience of installation.

As will be apparent with the construction illustrated and described, the terminal box 26 formed of insulating material and provided with its protecting cover plate 28 forms a heat insulated compartment adapted to protect enclosed temperature sensitive parts of the instrument such as the terminals shown as enclosed therein, from external temperature modifying effects, such as radiation from adjacent furnace parts, sunlight, and stray air currents.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. An instrument terminal block composed of a body of material having high thermal conductivity, apertures extending through the block, terminals having transversely extending surface portions, and a molded electrical insulating material engaging said surface portions and securing said terminals in said apertures and insulating said terminals from said body.

2. An instrument terminal box consisting of a molded structure of electrical insulating material, electrical terminals embedded in said material, a block removably supported in said structure, said block having a body of metal provided with apertures, a sheath of insulating material covering the surfaces of the metal, and electrical terminals passing through the apertures and embedded in the insulating material.

3. An instrument terminal construction comprising a metallic body, electrical terminals having transversely extending surface portions, and electrical insulating material engaging said surface portions and securing said body and terminals together and electrically insulating said terminals from the body.

4. In a thermoelectric pyrometer having a casing and conductors leading thereto including thermocouple lead wires, said casing including a compartment isolated from both the interior and exterior of said casing, said compartment having a wall portion common to the compartment and to the interior of the casing and provided with terminal posts mounted thereon for the attachment in said compartment of said conductors.

5. In a thermoelectric pyrometer having a casing and conductors leading thereto including thermocouple lead wires, said casing including a compartment isolated from both the interior and exterior of said casing, said compartment having a removable wall portion common to the compartment and to the interior of the casing and provided with terminal posts mounted thereon for the attachment in said compartment of said conductors.

6. A casing for a thermoelectric pyrometer instrument having a compartment the walls of which are thermally insulated, and a terminal block of high thermal conductivity in said compartment.

7. A thermoelectric pyrometer having a casing and conductors leading thereto including thermocouple lead wires, said casing including a compartment isolated from both the interior and exterior of said casing into which said conductors extend, said compartment having a wall portion common to the compartment and to the interior of the casing and comprising material of high thermal conductivity and provided with terminal posts mounted thereon for the attachment thereto of the said conductors extending into said compartments, and insulating means electrically insulating said terminal posts from each other.

8. A casing for a thermoelectric pyrometer instrument, having conductors including thermocouple lead wires leading into said casing, said casing including a compartment the walls of which are composed substantially entirely of material of low thermal conductivity and a terminal block of high thermal conductivity included in said compartment and terminals mounted on said block said terminals and insulating means electrically insulating said terminals from each other.

9. An instrument terminal block composed of a body of material having high thermal conductivity, apertures extending through the block, terminals mounted in said apertures, and an integral electrical insulating material casing for said body including portions extending through said apertures and insulating said terminals from said body.

10. A thermo-electric pyrometer having a casing and conductors leading thereto, including thermocouple lead wires, said casing including a compartment isolated from both the interior and exterior of said casing into which said conductors extend, said compartment having wall portion common to the compartment and to the interior of the casing and comprising a material of high thermal conductivity, and provided with terminal posts thereon for the attachment of leads of unlike thermo-electric properties, and insulating means electrically insulating said terminal posts from each other.

11. In a thermo-electric pyrometer having a casing and conductors leading thereto including thermocouple lead wires, said casing including a compartment isolated from both the interior and exterior of said casing, said compartment having a wall portion common to the compartment and to the interior of the casing, and provided with terminal posts mounted thereon for the attachment in said compartment of wires of unlike thermo-electric properties.

12. A thermo-electric pyrometer having a casing and conductors leading thereto including thermocouple lead wires, said casing including a compartment isolated from both the interior and exterior of said casing into which said conductors extend, said compartment having a wall portion common to the compartment and to the interior of the casing and comprising material of high thermal conductivity and provided with terminal posts mounted thereon for the attachment thereto of conductors of unlike thermo-electric properties extending into said compartment, insulating means electrically insulating said terminal posts from each other, and means for compensating for changes in the cold junction termperature of said leads.

13. In a thermoelectric pyrometer having a casing and conduit connections for conductors leading thereto including thermocouple lead wires, said casing including a compartment isolated from both the interior and exterior of said casing, said compartment having a wall portion common to the compartment and to the interior of the casing and provided with terminal posts mounted thereon, said terminal posts extending through said wall portion and being connected within said compartments to said conductors and said wall portion being formed with recesses in its side toward the interior of the casing, and a cover plate extending across said terminals and recesses and removable from the interior of said casing.

THOMAS R. HARRISON.
JOHN ERNEST KESSLER.
ERNEST H. GRAUEL.